D. GODOY.
CORN STRIPPING AND HUSKING MACHINE.
APPLICATION FILED OCT. 22, 1915.

1,258,669.

Patented Mar. 12, 1918.
3 SHEETS—SHEET 1.

INVENTOR
David Godoy
BY Mr Wallace White
ATTORNEY

D. GODOY.
CORN STRIPPING AND HUSKING MACHINE.
APPLICATION FILED OCT. 22, 1915.

1,258,669.

Patented Mar. 12, 1918.
3 SHEETS—SHEET 3.

INVENTOR
David Godoy
BY
Mr. Wallace White.
ATTORNEY

UNITED STATES PATENT OFFICE.

DAVID GODOY, OF BUENOS AIRES, ARGENTINA.

CORN STRIPPING AND HUSKING MACHINE.

1,258,669.  Specification of Letters Patent.  Patented Mar. 12, 1918.

Application filed October 22, 1915.  Serial No. 57,233.

*To all whom it may concern:*

Be it known that DAVID GODOY, citizen of Argentina, and resident of 109 Dolores St., Buenos Aires, Argentina, has invented certain new and useful Improvements in Corn Stripping and Husking Machines, of which the following is a specification.

This invention relates to an improved machine for mechanically stripping and husking corn, and one of its main purposes is to provide an apparatus which shall perform this operation in a reliable, speedy and efficient manner so as to save time and hand labor, these latter being conditions of the utmost importance where agricultural operations are concerned.

Another object of my invention is the provision of means whereby the machine is automatically adapted for stripping corn stalks of different sizes or diameters, which has heretofore caused much difficulty in the use of the known types of corn stripping and husking machines.

This purpose is realized, in accordance with this invention, by means of a series of rollers, which may or may not be fluted, and which during the operation of the entire machine are adapted to assume different positions according to the diameter of the stalks encountered by said rollers. This particular arrangement constitutes one of the main features of the invention which will be fully described later on.

Such an arrangement provides a single apparatus comprising as many different stripping devices as would formerly have to be separately employed in order to deal with the different diameters of corn stalks to be stripped, as in the present machine the said stripping rollers are so arranged that they can operate, simultaneously and independently one of the others, in different positions.

Figure 1:
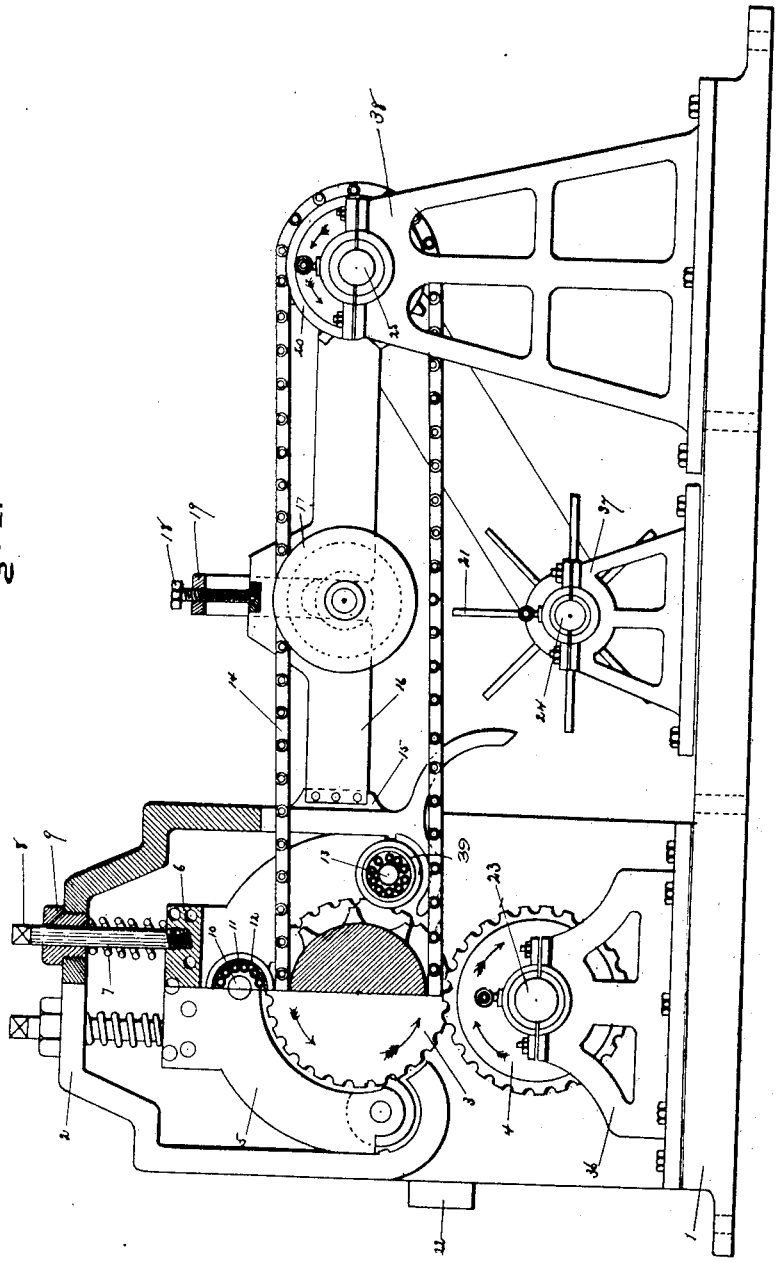

In order that this invention may be readily understood and carried into practice, it has been illustrated, by way of example, in the accompanying drawings which may be regarded as showing a preferred form of construction of said invention. In the same, Figure 1 is a lateral elevation of the corn stripping and husking machine, in accordance with this invention, parts of the machine being shown in section.

Figure 2:
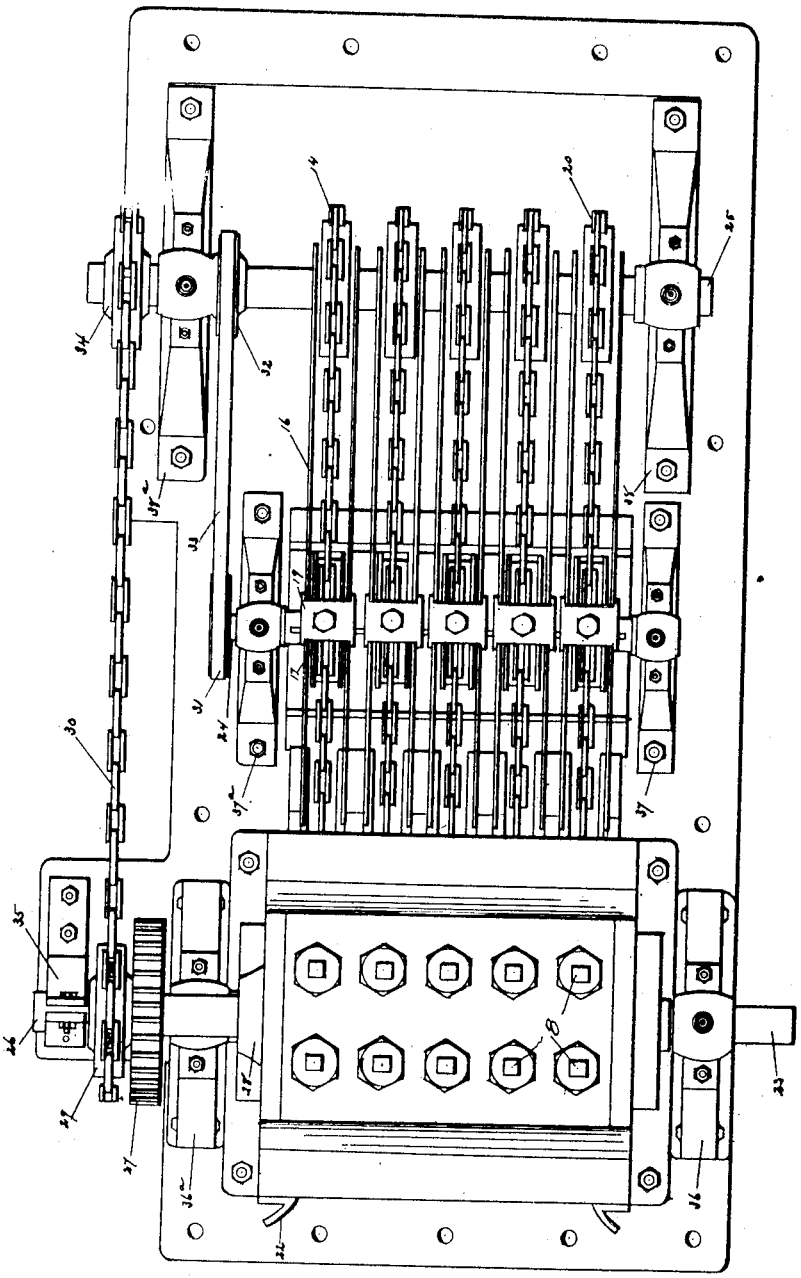
Figure 3:
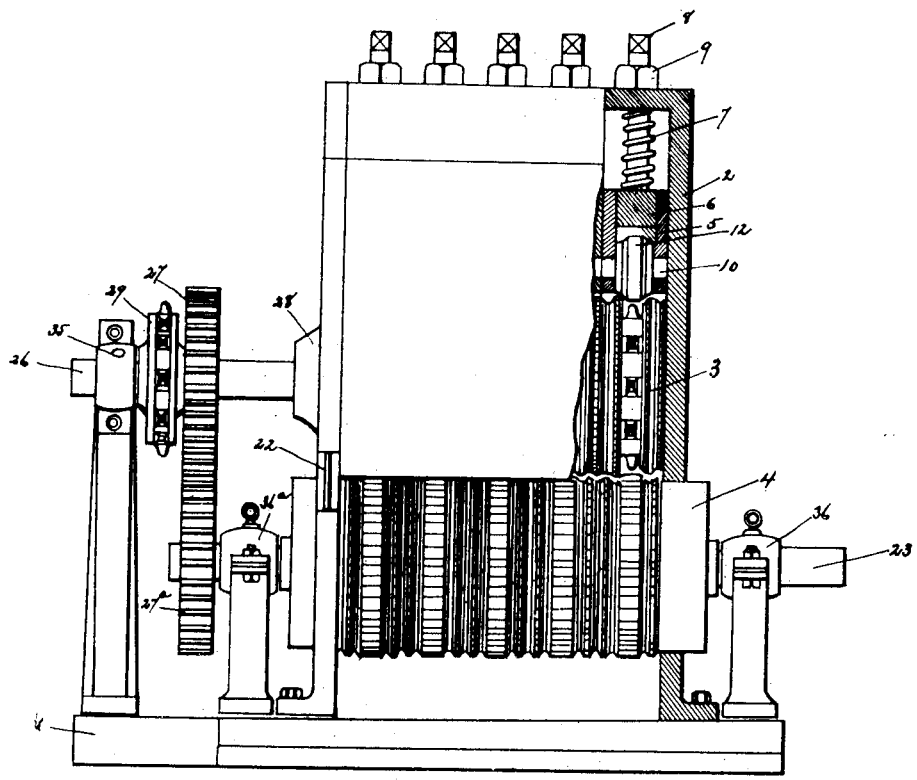

Fig. 2 is a plan view of the machine, and Fig. 3 is an end elevation of the same, parts being shown in section.

In all the said views, the same numbers of reference indicate like or corresponding parts.

The whole of the stripping and husking apparatus is mounted on a platform 1, of iron or any other suitable material. At one of the ends of the said platform 1, are carried two supports which support the bearings 36 in which is rotatably supported the shaft 23; to said shaft 23 is keyed so that it will rotate therewith, a grooved roller 4, of suitable diameter. To the end of the shaft 23 is keyed a spur wheel $27^a$ which gears with another spur wheel 27, keyed to the shaft $26^k$ rotatably mounted in the bearings 28 and 35. The gear wheel 27 serves to reverse the motion of the toothed wheel $27^a$, as will be seen when inspecting the drawing, and on the shaft 26 of the said wheel 27 is mounted a sprocket wheel 29 which by means of a suitable chain 30 transmits the motion derived from the shaft 25. This latter shaft is parallel to the shaft 23 and is supported in bearings 34 provided on the upper ends of the standards 38 and $38^a$.

On the said shaft 25 is mounted a series of sprocket wheels 20 which rotate with the said shaft and transmit the motion therefrom through the chains 14 to the rollers 3 which will be described later on.

For the purpose of keeping the chains 14 constantly under due tension, I provide the tension pulleys 17, supported by screws 18 and the trestles 19 serve to make a fair lead between the said pulleys 17 and the screws 18. The pulley 17 is supported by means of a plate 16, conveniently supported at 15.

The operation of stripping and husking the corn takes place between the grooved main roller 4 and a series of grooved rollers or roller sections 3 which are driven through the chains 14 by the toothed wheels or sprockets 20. For that purpose, the said rollers 3 are partially toothed in order to provide a gearing for the chain.

It has already been stated that the rollers 3 are enabled to effect a certain degree of separation from the main roller 4, so as to allow the machine to automatically adapt itself to the several diameters of corn stalks or plants to be stripped. In order to carry out this purpose, the said rollers 3 are mounted in the following manner:

A casing 2, suitably supported on the general frame work of the machine, forms a guide and support for the clamps 5, which are each secured at the top by means of an auxiliary connecting piece 6, by two bolts 8 which at the same time act as guides between the casing 2 and the clamp 5. At their upper part which projects from the casing 2, the bolts 8 are provided with nuts 9 which act as supports for the coiled springs 7 which surrounded the said bolts and exert pressure between the casing 2 and the said clamps 5.

The said coiled springs operate to maintain each of the rollers 3 in close contact with the roller 4, for the purpose of husking the corn ears during the reverse movement of said rollers 3 in relation to the main roller 4. In order to maintain the rollers 3 over the roller 4, these latter are guided at the side and held against the pull of the chains by means of guide sheaves 39 which rotate on ball bearings, their axles 13 being conveniently supported by the clamps 5. In the same manner and for the purpose of adjusting the height of the rollers 3 with regard to the roller 4, the aforesaid clamp carries at a point corresponding to the upper part of the said rollers 3, another sheave 12 which rotates also in ball bearings 11, mounted on the axle 10.

As will be understood from the foregoing, the rollers 3 have no axle, their respective positions being determined by the clamps 5 and the sheaves mounted thereon and as has already been explained, the said clamps are allowed a certain degree of displacement in a vertical direction which permits of the rollers 3 approaching or moving away from the roller 4, to a greater or lesser extent, according to the size or diameter of the stalk encountered.

The corn plants or stalks enter into the casing and are guided toward the rollers by means of the chute or spout 22.

After being husked, the ears are to be cleaned, at least partially, so as to separate any foreign materials as well as the husks. For that purpose, in the apparatus according to this invention a winnowing device is employed, which consists of a fan provided with any convenient number of vanes 21. Said fan is mounted on the axle 24 which on one of its ends has a pulley 31 for transmitting to it the motion derived by means of a belt 33 from another pulley 32 keyed to the corresponding end of the shaft 25. The axle 24 of the fan is mounted in the bearings 37 and 37ª, supported on the general platform 1 of the machine.

The operation of the machine is as follows: The grooved roller 4, driven by means of any suitable source of power, transmits its motion to the gear 27ª, and this latter in its turn to the gear 27 which therefore revolves in the opposite direction. The sprocket 29 keyed to the shaft which bears the gear wheel 27, moves together with said shaft and drives through the chain 30 the gear wheel 34, which when turning with its shaft 25 transmits the motion to the sprocket wheels 20 fixed to this latter shaft. The sprocket wheels 20 and their chains thus cause the rotation of the rollers 3 which by means of the mechanism already described, turn on the main roller 4. The sheaves adjusted on the ball bearings 11 serve as guides for the rollers 3, and the upper one of the said sheaves (Figs. 1 and 3) transmits the pressure received from the springs 7 placed between the casing 2 and the clamp or bracket 5.

The bracket 5 in which are mounted the sheaves 12 receives directly the pressure of the springs 7 and will rise or descend as may be required by the diameter or size of the corn stalk which is passing between the roller 4 and the rollers 3, owing to the resiliency of the said springs. During its rising and lowering movements, the bracket or clamp 5 is guided by the casing 2 in whose interior it is situated.

After starting the operation of the above described machine, the corn stalks introduced into the chute or hopper 22 between the grooved and toothed rollers 3 and the grooved roller 4, are drawn along by the rotation in opposite direction of the rollers and the stalks, leaves and ears will advance together until upon the approach of these latter at the rollers, their larger diameter will prevent them from passing between the rolls with the stalk and leaves, and the ear will be pulled out of the husk by the traction exerted on the fibers which connect the same to the stalk. The ears will thereupon fall out of the apparatus, owing to their weight and because they were not admitted into the space between the rollers 3 and the main roller 4. The operation of the remaining parts of the machine, such as the fan, etc., need not be described here as the same will be readily understood by any person skilled in the art.

It will be evident that changes or modifications may be introduced into the machine which forms the subject matter of this invention, without departing from the spirit thereof, the essential features of which are clearly pointed out in the claims.

Thus, for instance, the rollers may either be grooved or not, and might also be provided with an axle, if so desired. The said stripping and husking rollers as well as the main fixed roller may or may not be provided with teeth or pegs, or may be made of open work; they may be pentagonal, concave or convex or other desired or convenient shape, the same as the guide pulleys or sheaves and said elements may or may not be provided with friction cones. The number of rollers 3 used in connection with each of the fixed rollers, may also vary, and one or several series or sets of the same might be applied; and further, the aforesaid fixed roller might if desired, also be replaced by sets of small rollers which may be arranged in any suitable position. In a similar manner, the series of upper rollers may be replaced by one single fixed roller, provided or not with axles, both of the rollers being guided by guide sheaves, the same as in the cases above described.

I declare that what I claim and desire to secure by Letters Patent, is:

1. In a corn stripping and husking machine, in combination, a main roller, a plurality of independent disk-like rollers arranged normally in a line parallel to the axis of the main roller and adapted to coact with said main roller, and means for supporting said independent rollers at independently variable distances from and constantly parallel to the axis of said main roller.

2. In a corn stripping and husking machine, in combination, a main roller, a plurality of mutually independent disk-like rollers arranged normally in a line parallel to the axis of the main roller, and adapted to coact with said main roller, sheaves adapted to yieldingly maintain said independent rollers against said main roller and constantly parallel thereto, and yieldable brackets upon which said sheaves are mounted.

3. In a corn stripping and husking machine, in combination, a main roller, a plurality of disk-like coacting rollers arranged normally in a line parallel to the axis of the main roller, an independent set of guide sheaves engaging each of said coacting rollers, a bracket for each set of guide sheaves, and springs acting upon said brackets and adapted to yieldingly hold said coacting rollers against the main roller and constantly parallel thereto.

4. In a corn stripping and husking machine, in combination, a main roller, a plurality of independent disk-like rollers arranged normally in a line parallel to the axis of the main roller and adapted to coact with said main roller, means for supporting said disk-like rollers at independently variable distances from said main roller and constantly parallel thereto, and means to rotate said main and independent rollers in unison.

Signed at Buenos Aires, Argentine Republic this eleventh day of September A. D. 1915.

DAVID GODOY.

Witnesses:
J. H. AINSWORTH,
P. CHS. PETERSEN.

Copies of this patent may be obtained for five cents each, by addressing the "Commissioner of Patents, Washington, D. C."